PROTECTIVE CIRCUIT FOR A TRANSISTOR GATE
Filed Oct. 24, 1960
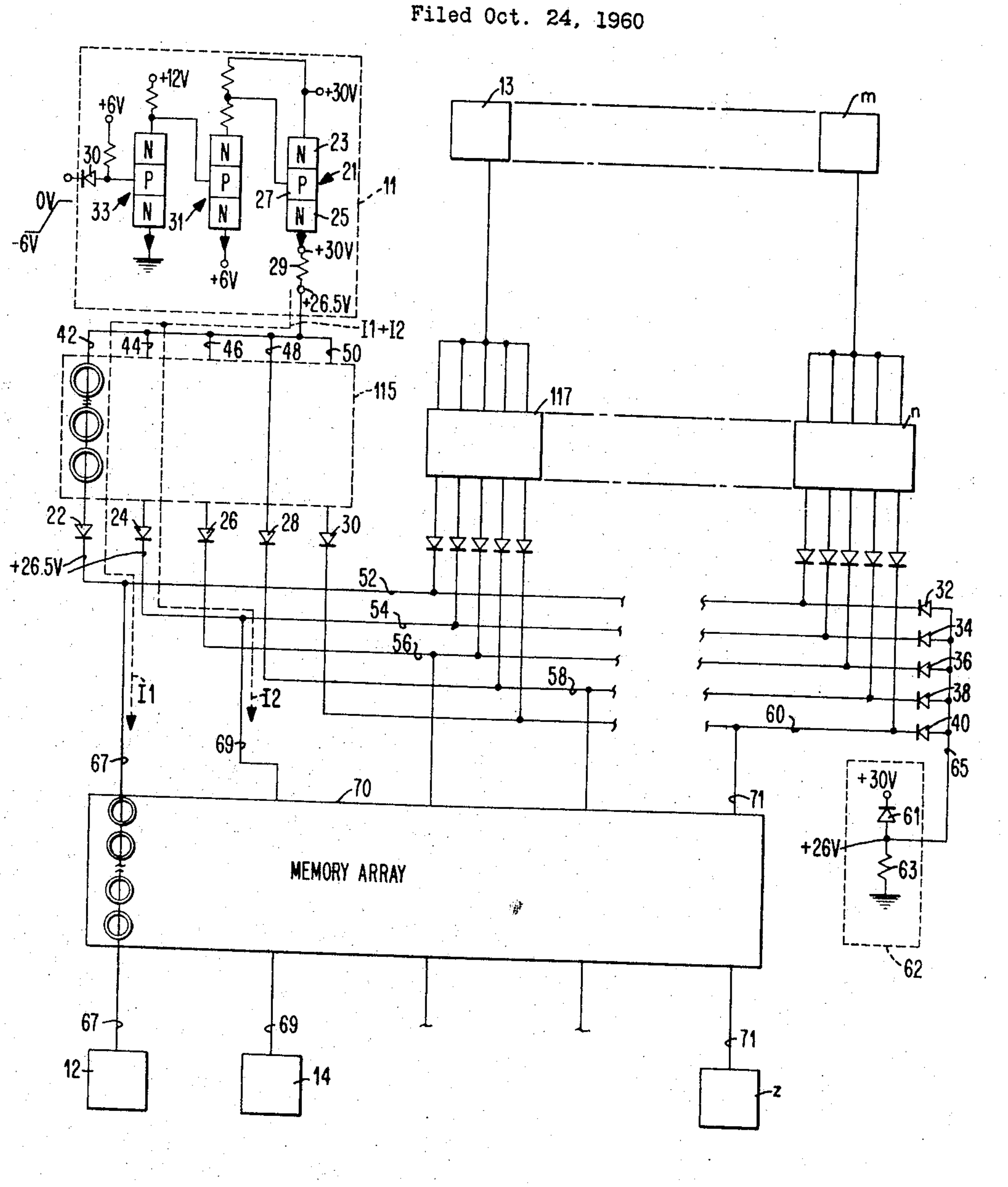
INVENTOR
MELVIN P. XYLANDER
BY Leo J. Aubel
ATTORNEY 3,188,499

PROTECTIVE CIRCUIT FOR A TRANSISTOR GATE

Melvin P. Xylander, Apalachin, N.Y., assignor to International Business Machines Corporation, New York, N.Y., a corporation of New York Filed Oct. 24, 1960, Ser. No. 64,473
6 Claims. (Cl. 307—93)

This invention relates to a protective circuit and more particularly to a circuit for maintaining the amplitude of the current flowing through a transistor gate within predetermined limits.

It is well known in the art that transistors are highly susceptible to permanent damage if the rated power dissipation is exceeded even momentarily. Therefore, it is necessary, in those transistor circuits in which the current flowing through a transistor may vary, to provide circuitry for controlling or limiting the maximum current which will flow through said transistor. Furthermore, any circuitry added to limit the current should not adversely affect the operation of the initial transistor circuitry.

Accordingly, it is a principal object of the present invention to provide an improved protective circuit for transistors.

It is another object of the invention to provide a protective circuit for a transistor which limits the amplitude of the current flowing through a given transistor to a predetermined maximum level.

It is another object of the invention to provide a protective circuit for a transistor which circuit does not adversely affect the operation of the initial transistor circuits.

In one preferred embodiment of the present invention, a transistor gate is connected through a resistor to a group of parallel connected loads, specifically, cores in a matrix. A first group of diodes is connected in series with respective loads. A second group of diodes is connected in back-to-back relation with respective diodes in the first group. A current sink is connected to said second group of diodes and provides a fixed biasing level thereto. Distinct sources of current are connected to the junction of each of the diodes in the first and second group. In operation, the sources of current are selectively energized to provide current to the respective loads. When the gate is opened, the diodes in the first group are forward biased by the voltage applied to the gate. If current is undesirably flowing through more than the given number of loads, the diodes in the first group tend to become reverse biased and the diodes in the second group are forward biased to channel any excess current flowing through the loads to flow to the current sink, thereby preventing the excess current from flowing through and damaging the transistor gate.

The foregoing and other objects, features and advantages of the invention will be apparent from the following more particular description of a preferred embodiment of the invention, as illustrated in the accompanying drawings.

The sole figure is a schematic diagram of a protective circuit in accordance with the invention.

Each of the gates 11, 13 . . . *m* is connected to respective switch matrices 115, 117 . . . *n*. The switch matrices in one embodiment each includes a parallel circuit comprising five drive lines; for example, referring to matrix 115, lines 42, 44, 46, 48 and 50. The drive lines in each switch matrix 115, 117 . . . *n* are wound, that is, pass through or thread a group of cores, not numbered, in the switch matrix. A diode is connected at the output of each of the drive lines in each of the switch matrices 115, 117 . . . *n*. For example, diodes 22, 24, 26, 28 and 30 are connected to lines 42, 44, 46, 48 and 50, respectively, which pass through switch matrix 115; the anodes of the diodes are connected adjacent the matrix 15 and the catthodes are connected to respective common lines 52, 54, 56, 58 and 60. Common lines 52, 54, 56, 58 and 60 connect the cathodes of the respective diodes in the various switch matrices 115, 117 . . . *n* in common. For example, common line 52 connects the cathode of diode 22 in matrix 115 in common to the cathodes of the corresponding diodes in memory matrices 117 . . . *n*.

Common lines 52, 54, 56, 58 and 60 connect to respective lines which inductively couple to the cores of memory array 70 and are thence connected to respective drivers. For example, lines 52, 54 and 60 connect to lines 67, 69 and 71 passing through respective groups of cores in the memory array 70 which lines, in turn, respectively connect to drivers 12, 14 and *z*.

Lines 52, 54, 56, 58 and 60 are connected through respective diodes 32, 34, 36, 38 and 40 to a single line 65. The anodes of diodes 32, 34, 36, 38 and 40 are connected to line 65 and the cathodes are connected through the respective common lines 52, 54, 56, 58 and 60 to the cathodes of respective diodes connected to the switch matrices 115, 117 . . . *n*. For example, the cathodes of diodes 32, 34, 36, 38 and 40 are connected in back-to-back relation to the cathodes of diodes 22, 24, 26, 28 and 30 respectively in switch matrix 115, and also to the corresponding diodes associated with switch matrices 117 . . . *n*.

Before further describing the over-all circuitry, the circuit details of gates 11, 13 . . . *m*, and the current sink 62 will be briefly described. Gates 11, 13 . . . *m* are similar so that a detailed description of gate 11 applies equally well to the other gates.

The current sources or drivers 12, 14 . . . *z* may be of any suitable type known in the art; therefore only a block representation thereof is shown.

As will be appreciated more fully hereinbelow, the operation of the circuit depends on the relative potentials applied to the various components. Some representative voltage levels to facilitate the explanation of the operation of the circuit are therefore noted in the figure. However, it will be understood that the voltages indicated are merely representative and the invention is not to be limited thereto.

In gate 11, an NPN type transistor 21 has its collector 23 connected to a positive potential and its emitter 25 connected through a resistor 29 to switch core matrix 115. The base 27 of transistor 21 is coupled through a pair of series connected NPN type transistor amplifiers 31 and 33, and a diode 30 to a signal source of any suitable known type, not shown. Suitable biasing or operating voltages are connected to transistors 21, 31 and 33 as is well known in the art. The signal source, not shown, provides a signal which varies from a negative six (6) volts to zero (0) volt. When a negative six volt signal is coupled through diode 30 to gate 11, transistor 33 is cut off, transistor 31 becomes conductive, and transistor 21 is cut off. When a zero volt signal is coupled to gate 11, transistor 33 is caused to conduct, transistor 31 is cut off, and transistor 21 is caused to conduct. When transistor 21 becomes conductive, gate 11 is considered open; that is, it permits current to flow therethrough.

Current sink 62 comprises a Zener-type diode 61 connected in series with a resistor 63 between ground and a positive potential of 30 volts. Zener diode 61 is connected in reverse polarity; that is, its cathode is connected to a positive potential of 30 volts and its anode is connected to resistor 63. The characteristics of diode 61 and resistor 63 are selected in the embodiment shown such as to provide a stable potential of approximately 26.5 volts output to line 65.

The operation of the over-all circuitry will now be described. As noted above, some representative voltages are indicated on the figure. In normal operation, two of the current sources or drivers 12, 14 . . . *z*, are selected and one of the gates 11, 13 . . . *m* is opened to provide or cause a current to flow through the respective lines of one of the switch matrices 115, 117 . . . *n* and the respective lines in memory array 70.

Referring to gate 11, the base 27 of transistor 21 is normally at twenty-four (24) volts; the base of the corresponding transistors in the other gates are also normally at twenty-four (24) volts. To open a channel to permit current flow through a gate, a zero (0) volt signal is applied to the respective gate. For example, still referring to gate 11, the zero volt signal causes base 27 of transistor 21 to raise to approximately a positive thirty (30) volts. The emitter 25 of transistor 21 is at virtually the same voltage as base 27. If no current is flowing, the anodes of diodes 22, 24, 26, 28 and 30 will be at the same voltage as the emitter 25 of transistor 21. Since the cathodes of diodes 22, 24, 26, 28 and 30 are connected in common to the cathodes of diodes 32, 34, 36, 38 and 40, respectively, the cathodes of the diodes will be at the voltage of the most positive anode voltage which, as noted, is thirty (30) volts.

Assuming that drivers 12 and 14 are energized, currents $I_1$ and $I_2$, indicated by the arrows, will be flowing. The summed currents $I_1$ and $I_2$ will flow through transistor 21 and resistor 29 developing an IR (current times resistance) drop across the resistor. The resistor 29 is chosen such that the IR drop developed when $I_1$ and $I_2$ are at a normal amplitude will be approximately 3.5 volts. The cores in memory array 70 and in switch matrix 115 provide a very low impedance load; consequently, the respective junctions of the cathodes of diodes 22, 24, 26, 28 and 30, and diodes 32, 34, 36, 38 and 40 will be at approximately 26.5 volts. Thus, diodes 22, 24, 26, 28 and 30 will be forward biased, and diodes 32, 34, 36, 38 and 40 are reverse biased by approximately one-half volt. (Note line 65 connecting the anodes of diodes 32, 34, 36, 38 and 40 to current sink 62 is at a positive twenty-six (26) volts.) If, for any reason, the total current flowing through resistor 29 exceeds the normal value of the sum of currents $I_1$ and $I_2$, the IR drop developed across resistor 29 will increase and the anodes, and thus the cathodes, of diodes 22, 24, 26, 28 and 30 will tend to go more negative. However, the clamping diodes 32, 34, 36, 38 and 40 prevent the common cathodes from going more negative than twenty-six (26) volts; that is, when the cathodes of diodes 22, 24, 26, 28 and 30 tend to go more negative than twenty-six (26) volts, the diodes 32, 34, 36, 38 and 40 will become forward biased. All the current in excess of the normal sum of $I_1$ plus $I_2$ will then be shunted through the clamping diodes 32, 34, 36, 38 and/or 40 to line 65 and the current sink 62.

Thus the amplitude of the current flowing through transistor gate 11 is limited to a predetermined level, consequently preventing said transistor gate from being damaged by any excess currents flowing therethrough.

In the particular data processing machine in which the protective circuit according to the invention is utilized, only one of the gates 11, 13 . . . *n* is opened at a given time to permit current flow therethrough. However, the circuit of the invention is applicable to limit the current flowing through a gate even if more than one gate is open at a given time.

It should be understood that other electronic devices such as tubes or PNP type transistors may be employed in place of the NPN type transistors of gates 11, 13 . . . *n*; suitable operating potentials as is known in the art would be provided thereto.

While the invention has been particularly shown and described with reference to a preferred embodiment thereof, it will be understood by those skilled in the art that various changes in form and details may be made therein without departing from the spirit and scope of the invention.

What is claimed is:

1. A protective circuit for limiting the current from a plurality of sources flowing through an electronic gate comprising, in combination, a first group of paths for channeling the current from said sources to said gate, a current sink, auxiliary paths from said sources to said current sink, unilateral conducting devices connected in said paths, means for biasing said devices in said first paths to conduct when the current flowing through said gate is within a set limit, and means for biasing said devices in said auxiliary paths to conduct current from said sources to said current sink when the current flowing through said gate tends to go above said set limit.

2. A protective circuit for limiting the current from a plurality of sources flowing through an electronic gate comprising, in combination, a first group of paths for channeling current from the sources to said gate, a current sink, auxiliary paths from said sources to said sink, current control means in said paths, said control means in said first paths being biased to permit current flow through said gate when the total current flowing through said gate is below a set amplitude, and said control means in said auxiliary paths being biased to permit excess current to flow to said current sink when the total current tending to flow through said gate is above said set amplitude.

3. A protective circuit for an electronic gate comprising, in combination, a first group of diodes, a second group of diodes connected in back-to-back relation with respective ones of said first group of diodes, a resistive element connected in series with said gate and in common to the diodes of said first group, a current sink connected in common with the diodes of said second group, means for coupling current to the respective junctions of said first and second groups of diodes, said first group of diodes being forward biased when said gate is opened and the total current flowing through said gate is below a set amplitude, and said first group of diodes tending to be reverse biased and said second group of diodes being forward biased by the potential drop developed across said resistive element when the current flowing through said gate tends to exceed said set amplitude whereby any current in excess of said set amplitude is channeled to flow to said current sink.

4. A protective circuit for a transistor gate comprising, in combination, first and second groups of diodes, the diodes in said first group being connected in back-to-back relation with respective diodes in said second group, a resistive element connected in series with said gate and in common to the diodes of said first group, a current sink connected in common to said second group of diodes, a plurality of low impedance loads connected to the junction of respective ones of the diodes in said first and second groups, sources of current each connected to provide a predetermined amplitude of current to a respective load, the diodes of said first group being forward biased when said gate is opened to permit current to flow through said gate, a potential drop being developed across said resistive element to tend to reverse bias the diodes of said first group and to forward bias the diodes of said second group when the total current flowing through said gate is more than the sum of current from two sources, whereby any excess current is channeled to flow to said current sink and thus prevent said transistor gate from being damaged.

5. A protective circuit for a transistor gate, a plurality of low impedance loads, a plurality of current sources connected to provide a predetermined amplitude level of current to respective ones of said loads; first and second groups of diodes; a diode in each group having its cathode connected to a cathode of a respective diode in said second group; a resistive element connected in series with said gate and in common to the anodes of said first group of diodes; a current sink connected in common to the anodes of the second group of diodes; said loads being connected to the junction of respective ones of said diodes in said first and second group; means for opening said gate when said sources are energized to permit current to flow through the respective loads, diodes in said first group, said resistive element and said gate; said diodes in said first group being forward biased and said diodes in said second group being reverse biased to permit current flow through said gate when current is flowing through two of said loads; said diodes in said first group tending to be reverse biased and said diodes in said second group being forward biased when current is flowing through more than two loads to cause any excess current to flow to said current sink.

6. A protective circuit for limiting the current flowing through a transistor connected as an emitter follower, a plurality of low impedance loads; a plurality of current sources connected to provide a predetermined amplitude level of current to respective ones of said loads; first and second groups of diodes; a diode in each group having its cathode connected to a cathode of a respective diode in said second group; a resistive element connected in series with said emitter follower and in common to the anodes of said first group of diodes; a current sink connected in common to the anodes of the second group of diodes; said loads each being connected to the junction of respective ones of said diodes in said first and second groups; means for biasing said emitter follower to conduction when said sources are energized to thereby permit current to flow through the respective loads, the diodes in said first group, said resistive element and said emitter follower; said diodes in said first group being forward biased and said diodes in said second group being reverse biased to permit current flow through said emitter follower when a current equivalent to the sum of the current from two sources is flowing through said emitter follower, said diodes in said first group tending to be reverse biased and diodes in said second group being forward biased by the potential drop developed across said resistive element when any current in excess of sai sum tends to flow through said emitter follower, whereby said excess current is channeled to said current sink.

References Cited by the Examiner

UNITED STATES PATENTS

| | | | |
|---|---|---|---|
| 2,665,845 | 1/54 | Trent | 317—33 X |
| 2,980,845 | 4/61 | Thompson et al. | 307—92 X |

MILTON O. HIRSHFIELD, *Primary Examiner.*

ORIS L. RADER, LLOYD McCOLLUM, *Examiners.*